(12) United States Patent
Lehtiniemi et al.

(10) Patent No.: US 9,135,927 B2
(45) Date of Patent: Sep. 15, 2015

(54) METHODS AND APPARATUS FOR AUDIO PROCESSING

(75) Inventors: Arto J. Lehtiniemi, Lempaala (FI); Juha H. Arrasvuori, Tampere (FI); Antti Eronen, Tampere (FI); Miikka T. Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 13/460,039

(22) Filed: Apr. 30, 2012

(65) Prior Publication Data

US 2013/0289754 A1    Oct. 31, 2013

(51) Int. Cl.
| | |
|---|---|
| G06F 17/00 | (2006.01) |
| G06F 3/048 | (2013.01) |
| G10L 21/0216 | (2013.01) |
| G06F 3/0488 | (2013.01) |

(52) U.S. Cl.
CPC ........ *G10L 21/0216* (2013.01); *G06F 3/04883* (2013.01)

(58) Field of Classification Search
CPC .. H04R 3/005; H04R 2430/20; H04R 29/008; H04R 5/027; G06F 3/04883; G06K 9/00335; G06K 9/224; G10K 11/34; H04S 7/40
See application file for complete search history.

(56) References Cited

U.S. PATENT DOCUMENTS

| | | | | |
|---|---|---|---|---|
| 5,715,318 A | * | 2/1998 | Hill et al. | 381/300 |
| 2004/0228498 A1 | * | 11/2004 | Sekine | 381/303 |
| 2008/0259731 A1 | * | 10/2008 | Happonen | 367/121 |
| 2010/0123785 A1 | * | 5/2010 | Chen et al. | 348/207.11 |

FOREIGN PATENT DOCUMENTS

| | | |
|---|---|---|
| EP | 2 251 857 A1 | 11/2010 |
| WO | WO-00/34942 A1 | 6/2000 |
| WO | WO-2009109217 A1 | 8/2009 |
| WO | WO-2011/076286 A1 | 6/2011 |
| WO | WO-2012061149 A1 | 5/2012 |

OTHER PUBLICATIONS

Wiggins, Bruce, "An Investigation Into the Real-Time Manipulation and Control of Three-Dimensional Sound Fields", University of Derby, 2004, 348 pgs.
Arrasvuori, Juha, et al.; "Designing interactive music mixing applications for mobile devices," *DIMEA '07 Proceedings of the 2nd international conference on Digital interactive media in entertainment and arts; ACM* New York, NY, USA © 2007; pp. 20-27.

* cited by examiner

*Primary Examiner* — Curtis Kuntz
*Assistant Examiner* — Thomas Maung
(74) *Attorney, Agent, or Firm* — Harrington & Smith

(57) ABSTRACT

Systems and techniques for determining characteristics to be exhibited by a sound phrase. A user draws traces on an input device indicating characteristics, such as duration and direction, of sounds such as sounds to be captured by a microphone array. In response to the user inputs, signals from the microphone array are processed to produce a signal exhibiting the characteristics. The signal is stored to create a sound phrase, and the sound phrase may later be played. Additional inputs may be received specifying a direction from which the sound phrase is to be played, or playback may come from a default direction. Further inputs may be received during playback to control characteristics of the playback. In addition to specifying characteristics to be imparted to recorded or stored phrases, user inputs may specify characteristics for generated sounds or may specify characteristics to be exhibited by sounds being played.

19 Claims, 6 Drawing Sheets

METHODS AND APPARATUS FOR AUDIO PROCESSING

TECHNICAL FIELD

The present invention relates generally to sound processing. More particularly, the invention relates to systems and techniques for user control of the duration and apparent spatial direction of an audio signal.

BACKGROUND

The ability of electronic devices to provide ordinary users with opportunities to exercise their creative abilities has never been greater. Many users have portable devices with great ability to record sound, and to record still and moving images. Devices with greater capability may be larger and more complex than commonly used portable devices, but larger and more complex recording devices are more capable, smaller, and less expensive than ever before.

However, the abilities of users to control and manage devices typically have not kept pace with the rapid increase in capability of these devices. This is particularly true in the case of devices that allow for creative expression. Many phenomena, such as recorded sound, include subtle characteristics and variations, and such phenomena can be played back in a more interesting and pleasing manner if a user has the ability to properly direct and shape the recording and playback. However, many devices that provide the ability to manage the recording of sound have complex interfaces that require considerable skill, and the inherent complexity of the task also tends to call for skill beyond that of the average user of an electronic device.

SUMMARY

According to one embodiment of the invention, an apparatus comprises at least one processor and memory storing computer program code. The memory storing the computer program code is configured to, with the at least one processor, cause the apparatus to perform actions comprising at least determining at least one sound characteristic based on at least one user input comprising at least one trace on an input device, and performing at least one control operation to cause a sound phrase to exhibit the at least one sound characteristic.

According to another embodiment of the invention, a method comprises configuring at least one processor to cause an apparatus to perform actions comprising at least determining at least one sound characteristic based on at least one user input comprising at least one trace on an input device, and performing at least one control operation to cause a sound phrase to exhibit the at least one sound characteristic.

According to another embodiment of the invention, a computer readable medium stores a program of instructions. Execution of the program of instructions by a processor configures an apparatus to perform at least determining at least one sound characteristic based on at least one user input comprising at least one trace on an input device, and performing at least one control operation to cause a sound phrase to exhibit the at least one sound characteristic.

DETAILED DESCRIPTION

Figure 1:
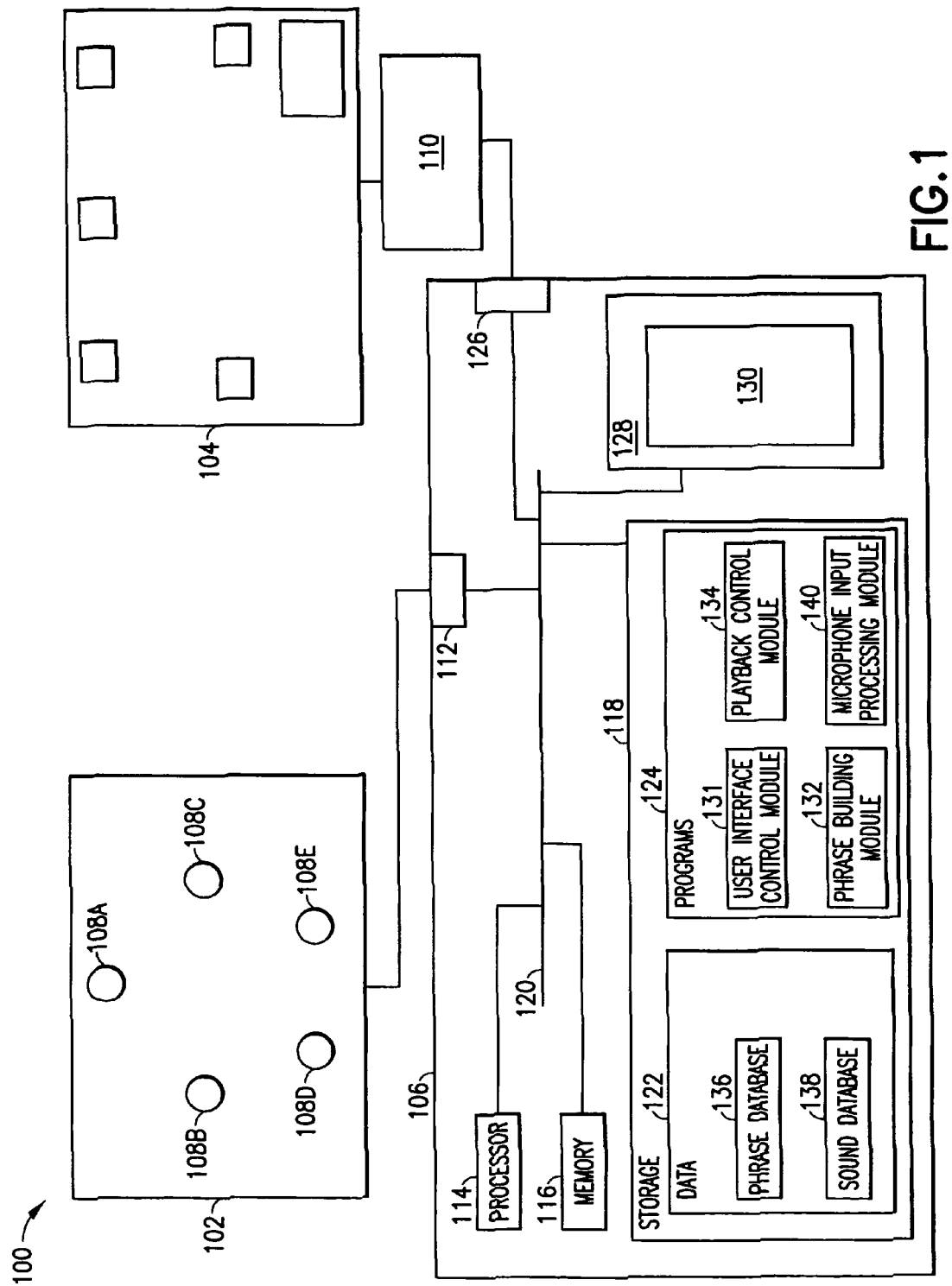
FIG. 1 illustrates a sound recording and playback system according to an embodiment of the present invention.

Embodiments of the present invention recognize that arrays of microphones can be used to record sounds coming primarily from a desired direction. A recording direction can be specified and the sound signals from microphones in the array can be processed so that the primary sound component in the combined signal is the component coming from the specified direction. Such a procedure is known in the art as controlled beamforming. Such controlled beamforming is typically performed using microphones set in a grid, with spacing between microphones depending on the frequency range where the sound source localization is desired. Embodiments of the present invention recognize that the duration and direction of sound can be visually represented, and that easier mechanisms for representing the duration, direction, and nature of sounds allow users to create and experiment with sound phrases that may be played both by themselves and as accompaniments to other content, such as still or moving images. A sound phrase may be considered as any defined sound that may be presented for playback. A sound phrase may be, for example, unprocessed recorded sound that is played back in the same form in which it was recorded, processed recorded sound, combinations of sounds, such as combined musical phrases and ambient sounds, and any of numerous other combinations of recorded, captured, stored, and created sounds. One way to view a sound phrase is as a pattern comprising one or more spatial audio components, which may suitably be recordings, samples, or created sounds. In one or more embodiments of the invention, a sound phrase may comprise one or more a brief audio components, and may be combined with other sound phrases to form a longer composition.

A sound phrase may comprise silent periods. A sound phrase may comprise simultaneous or overlapping components, and multiple sound phrases may be overlapped or combined sequentially to form longer sections of a sound composition. Different sound phrases may comprise, for example, music, speech, ambient sounds, synthesized or artificially generated sounds, combinations thereof such as sequences or mixtures, or any other sounds or combinations of sounds that may be desired, and compositions may comprise a single sound phrase or any desired combination or sequence of sound phrases. Mechanisms according to one or more embodiments of the present invention provide for a simple user interface allowing a user to define sound characteristics, such as duration and apparent direction, so that a user can make simple inputs defining characteristics that can be applied to recorded, stored, synthesized or otherwise generated sounds, or can be applied to sound playback, even in cases in which sounds were initially recorded or stored with different characteristics. User inputs can also be used to alter characteristics of sounds as they are played, with a user being able to make changes during playback as desired.

In an example, a microphone array may capture ambient sounds, and processing elements may process sound signals from microphones of the microphone array to produce a composite sound signal representing sounds from a particular direction for particular durations. A user may specify the direction of sounds. For example, a user may draw lines and make selections on a user interface such as a touch screen display, and the lines may also include directional indicators specifying the directions from which the sound is to come. In this way, a user is able to build phrases and combinations of phrases specifying the recording of sounds from specified directions. In addition or as an alternative, lines drawn by a user may specify that stored sounds are to be played, such as sounds previously recorded using the microphone array, and directional indicators drawn by the user may indicate directions from which sounds are to be played from a speaker array.

FIG. 1 illustrates a sound recording and playback system 100 according to an embodiment of the present invention. The system 100 is illustrated here as a combined recording and playback system for convenience, but it will be recognized that sound phrases constructed using embodiments of the present invention may be played using numerous different mechanisms, and sound phrases constructed using numerous different mechanisms may be played using embodiments of the present invention.

The system 100 comprises a microphone array 102, a speaker array 104, and a sound processing system 106. The microphone array 102 comprises a plurality of microphones 108A-108E, connected to the sound processing system 106. The speaker array 104 may be a 5.1 speaker array, connected to an amplifier 110. Mechanisms are known in the art for processing signals from an arrangement of microphones, such as an array of at least three microphones, to analyze the spatial qualities of the sounds captured by the microphone array. Such processing can identify the direction of sounds reaching the microphone array, and proper processing of the signals can create a composite signal representing sounds coming from one direction.

The sound processing system 106 comprises a microphone interface 112, allowing a connection to the microphone array 102, or to each individual microphone of the array 102, depending on particular system design. The sound processing system 106 also comprises a processor 114, memory 116, and storage 118, communicating with one another and with the microphone interface 112 over a bus 120. The sound processing system 106 may employ data 122 and programs 124, suitably residing storage 118 and transferred to memory 116 as needed for use by the processor 114.

The sound processing system 106 may also comprise an audio output interface 126, which may be implemented, for example, as a digital connector. The sound processing system 106 may include a user interface 128, which may comprise a touch screen display device 130, for example. By drawing simple lines or shapes on the touch screen device 130, or making choices from among menu options or icons presented on the display, a user is able to build and edit sound phrases that may include single or overlapping tracks constructed from sounds captured by the microphone array, sounds received from other sources, sounds stored within the sound processing system 106, or sounds created using any sound creation features that may be provided by the sound processing system 106. For example, stored sounds may include sounds from existing audio or audiovisual media, such as a soundtrack of an audiovisual recording made by the user or obtained by the user from another party such as clips from a movie soundtrack.

The sound processing system 106 may employ a user interface control module 131 to direct the presentation of information by and interpretation of inputs received at the user interface 128.

The sound processing system 106 may employ a phrase building module 132 and a playback control module 134, and may further store a phrase database 136 and a sound database 138. The phrase database 136 stores phrases that have been constructed using the sound processing system 106, and the sound database 138 stores sound samples that have been previously recorded, imported from elsewhere, or stored in the database 138 during configuration of the sound processing system 106. The phrase building module 132 and the playback control module 134 may use stored phrases and sound samples to construct phrases, and may store newly constructed phrases in the phrase database 136. The sound processing system 106 may also include a microphone input processing module 140, which processes input signals from the microphone array 102 and may, in response to appropriate configurations and user selections, create an input signal representing an input from a specified direction.

The phrase building module 132 presents one or more interface displays to a user, allowing the user to designate characteristics of a sound phrase. Such characteristics may include the duration of recording of a phrase, the direction of recording, and the duration of playback. In one or more embodiments of the invention, designation of characteristics of a phrase may include specification that sounds to be recorded are similar to specified sounds. For example, a user may be presented with a selection of instruments. If the user selects a particular instrument, the phrase building module 132 may analyze recorded sounds and highlight sound components similar to those produced by the selected instrument. Such analysis may be performed, for example, by comparing components of the recorded sound to a sound sample characteristic of the selected instrument. The user might, for example, select a bass drum and the selection might cause highlighting of lower-frequency recorded sounds in the constructed sample.

The sound processing, recording, interface, and playback components of the system 100 are presented distinctly here, but it will be recognized that embodiments of the present invention may be implemented in a more integrated form. For example, recording, processing, interface, and playback mechanisms may all be integrated in a single unit. For example, a typical tablet device includes a suitable user interface, and such a device may be adapted to include microphones, speakers, and playback mechanisms suitable for carrying out embodiments of the present invention. In addition or as an alternative to providing its own built-in speakers, such a device may include an interface, which may be a digital interface, to an external sound system, and may provide an appropriately processed signal to the sound system. Similarly, a device may include a connection to an external microphone array and may provide for processing signals from the external microphone array.

Figure 2:
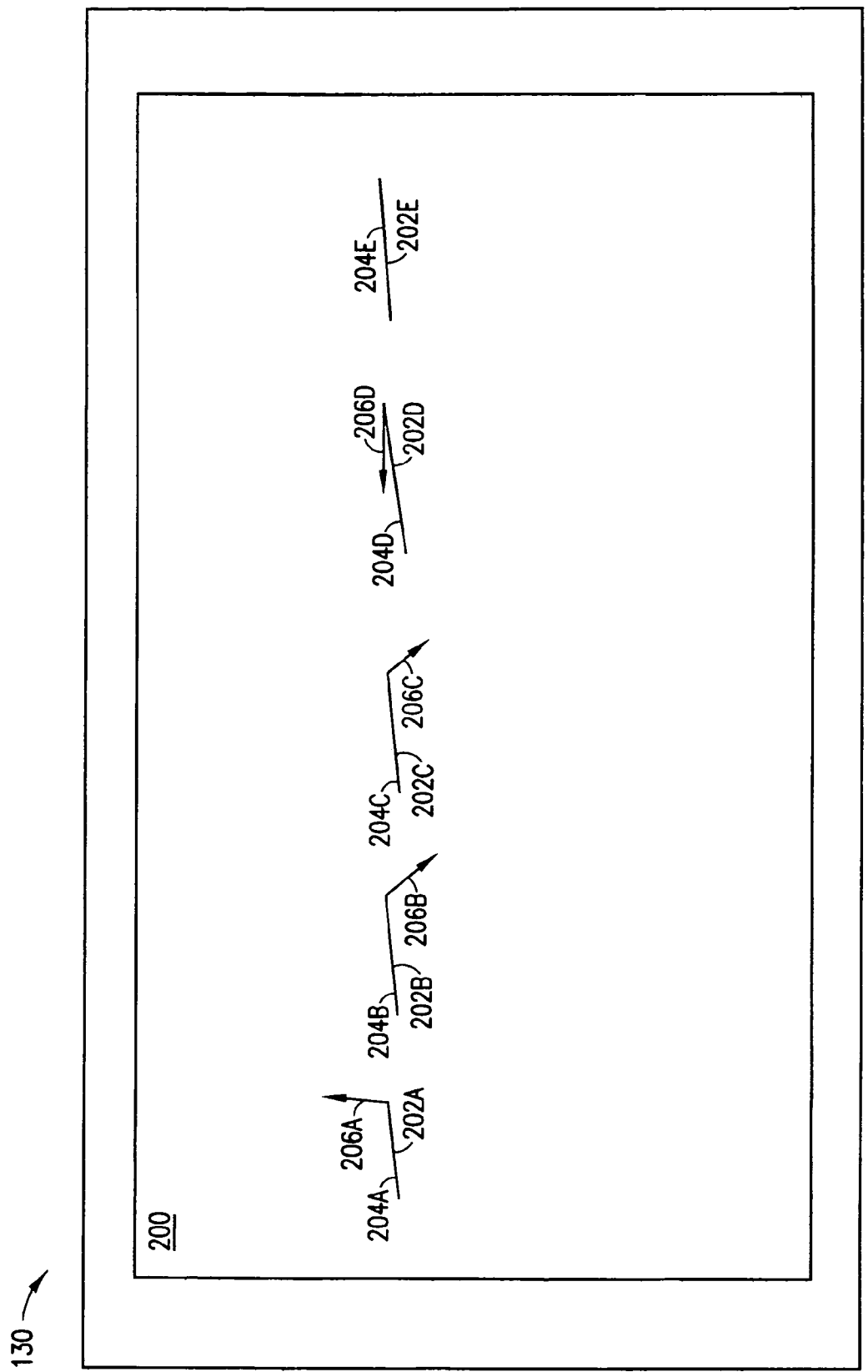
FIGS. 2-4 illustrate exemplary displays according to an embodiment of the present invention.

FIG. 2 illustrates the display device 130, presenting a display 200 according to an embodiment of the present invention. In the exemplary embodiment presented here, the display device 130 is a touch screen display and allows a user to make inputs by drawing on the screen, such as with a finger or stylus.

The display 200 presents the result of user inputs representing directions to record sound phrases. The display presents inputs 202A-202E, with the inputs 202A-202E having generally horizontal portions 204A-204E. In the present example, the inputs 204A-204D also have directional portions 206A-206D, respectively. The horizontal portions 204-204E of the inputs indicate the duration of recording of each phrase. The horizontal extent of the display 200 may indicate the maximum time duration available, and the user can easily enter an input representing the proper time by drawing a horizontal line over an appropriate portion of the display 200.

The directional portions 206A-206D of the inputs indicate the dominant direction from which sound is to be recorded, and for each of the inputs 202A-202E, the microphone input processing module 140 constructs a signal whose dominant components are taken from the indicated direction. In the case of the input 202E, there is no directional component, and so the input 202E may be taken to indicate that the sound is to be recorded based on a default selection, such as from the front of the microphone array 102 or omnidirectionally from around the microphone array 102. The user input control module 131 interprets user inputs made using the display device 130 and provides appropriate directions to the phrase building module 132. The phrase building module 132 constructs sound phrases based on the user inputs and stores them in the phrase database 136.

Figure 3:
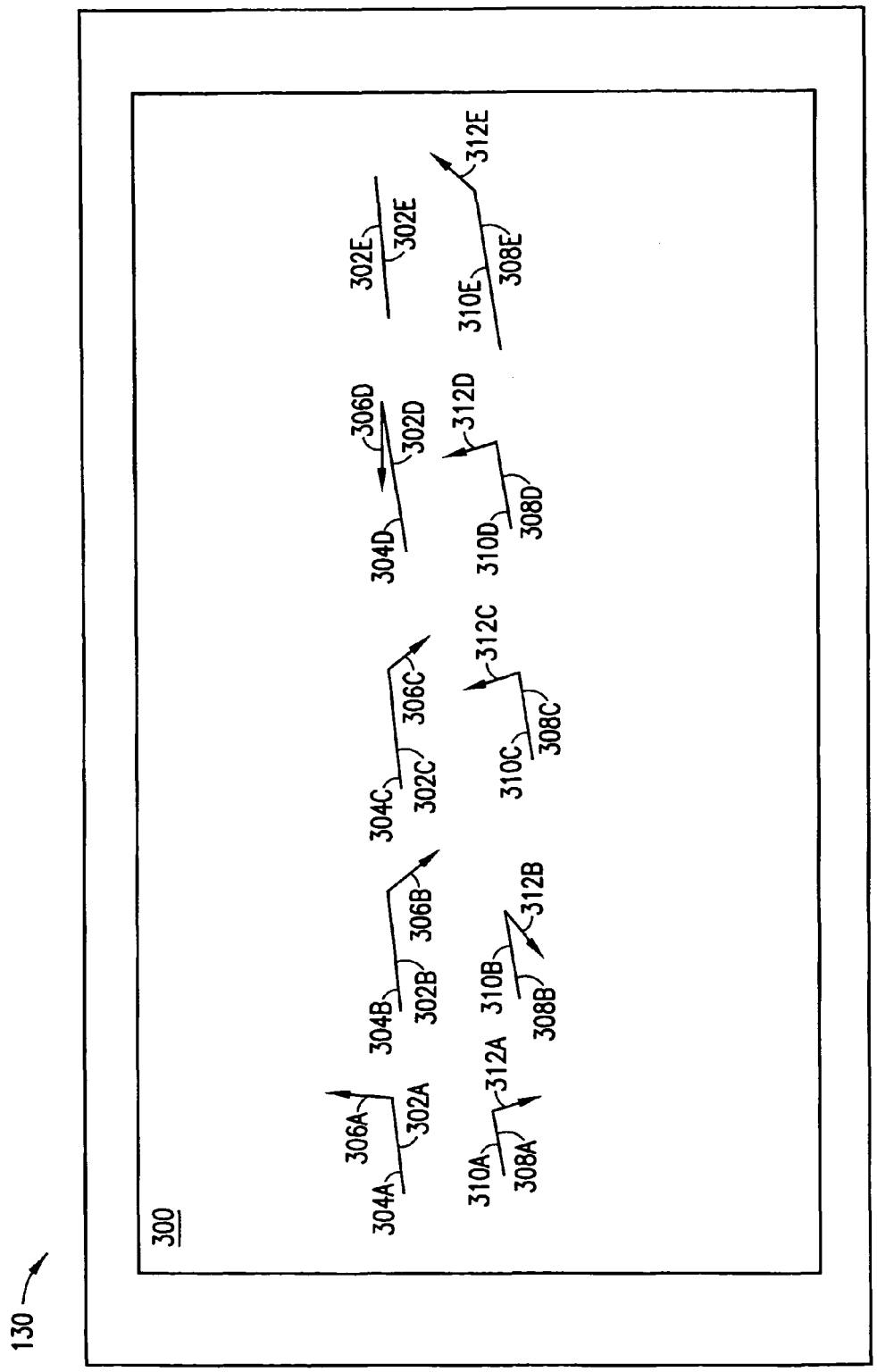

FIG. 2 illustrates user inputs for the construction of phrases comprising sounds from a single direction at any particular time, but it is a simple matter to use the display device 130 to direct construction of overlapping tracks. FIG. 3 illustrates a display 300 presented by the display device 130. The display 300 shows inputs 302A-302E, with horizontal components 304A-304E, and with inputs 302A-302D having directional components 306A-306D. The display 300 also shows inputs 308A-308E, with horizontal components 310A-310E and directional components 312A-312E. The user input control module 131 interprets the inputs represented by the display 300 as calling for multiple recordings at the specified times and for the specified durations, with portions of lines occupying the same horizontal portion of the display 300 as calling for simultaneous recording. The user control module 131 interprets such occupancy of the same horizontal portion of the display 300 as indicating an overlap in time, and presents this interpretation to the phrase building module 132. The phrase building module 132 constructs phrases comprising multiple recordings from different directions, overlapping in time as indicated by the illustrated inputs.

Figure 4:
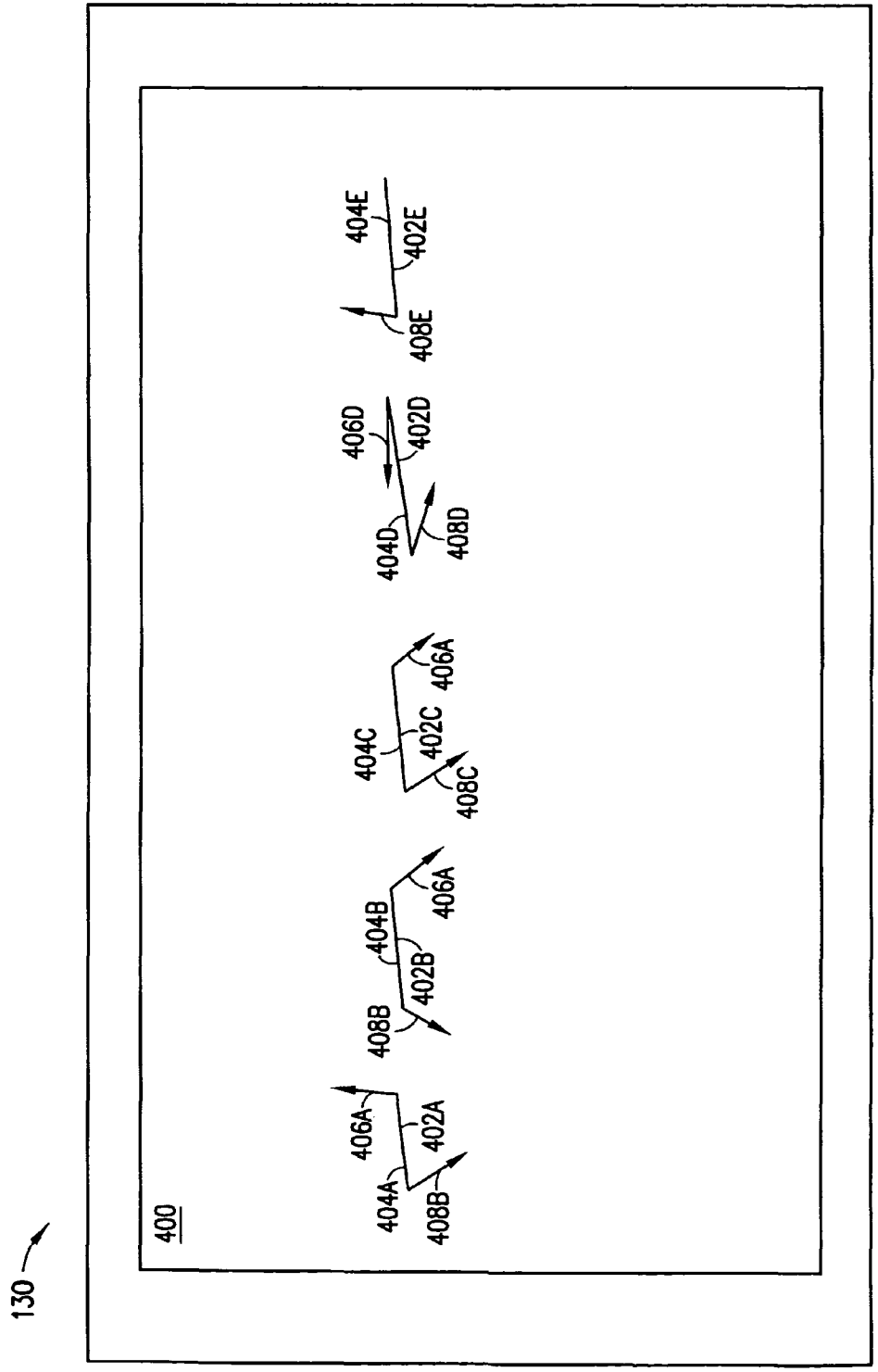

In one or more embodiments of the invention, playback of phrases represented by horizontal and directional recording inputs is configured according to a default. For example, a recorded phrase or component of a phrase may be played back from the direction from which it was recorded. In one or more other embodiments of the invention, the user can indicate playback directions, and such playback directions may be different than the recording directions. Alternatively or in addition, a playback direction may be specified by the user. FIG. 4 illustrates a display 400, showing inputs 402A-402E, with the inputs 402A-402E having horizontal components 404A-404E, respectively, and with the inputs 402A-402D having input directional components 406A-406D, respectively. The inputs 402A-402E also have output directional components 408A-408E, respectively. The playback control module 134 is able to receive interpretations of input information as processed by the interface control module 131 and control the signals provided to the amplifier to cause appropriate directional playback from the speaker array 104.

Figure 5:
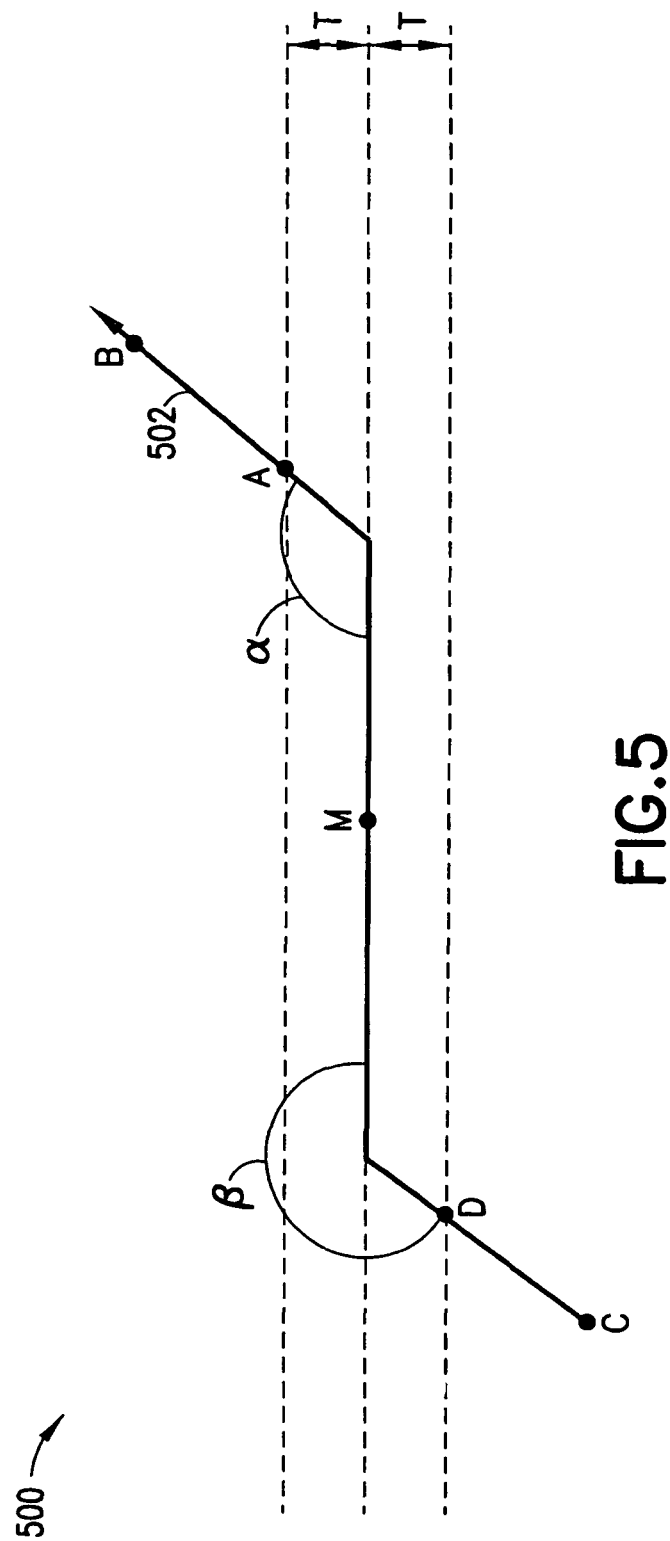
FIG. 5 illustrates a formatted user input according to an embodiment of the present invention.

The user inputs may suitably be allowed to be more or less free, with the interface control module 131 being able to interpret the inputs and put them into a regular format. For example, FIG. 5 illustrates a diagram 500 showing a formatted user input 502. The user input 502 represents a free-form user input after it has been interpreted according to constraints such as thresholds used to determine when a phrase begins and ends and minimum increments for directional angles.

For example, when the line the user is drawing goes below or above the starting point of the line by a predetermined threshold (T), the phrase ends. Suppose that the point A is the point where the line passes the threshold T and the point B is the point when user lifts his finger. The angle α between a horizontal line and a line between points A and B determines the direction from which the phrase will be recorded. Beamforming is used for recording sounds whose primary components come from the specified direction. If no directional indicator is present, then a phrase may be recorded from a predetermined direction, such as from all directions or directly from front. In one or more embodiments of the invention, a phrase is played back from the same direction from which it was recorded.

The phrases can be played from a desired direction by using any of a number of known mechanisms. If the playback is in stereo or surround sound such as 5.1 surround sound, the sound can be panned to any direction between the stereo speakers or any direction on the horizontal plane in the case of a 5.1 surround sound configuration. In one embodiment, vector based amplitude panning (VBAP) can be used for panning. If the playback is on headphones then head related transfer function (HRTF) filters can be used to create binaural sound.

In one or more embodiments of the invention, as noted above, a user can control the direction of playback for a phrase. As noted above with respect to FIG. 4, a user can indicate a desired direction for sound playback by drawing a segment before the horizontal component of the input. The angle β between the starting point C and the point D where the phrase line begins determines the direction from which the desired sound is played. The point D is defined as the point from which the line stays within limits T in comparison to the middle point M. The middle point M is the half-way point between points B and C.

The recorded sound source should be preferably continuous to create a rhythmic output of the phrase recording. The user of the device can ensure this by searching places with continuous background ambiance. An alternative way is to record continuously from all directions and the phrases would select the content to be played.

In some embodiments of the invention, the user interface may provide some functionality helping the user to draw lines with durations matching the durations of musical notes. In one embodiment of the invention, the user may be allowed to select at least one of a tempo and a time signature, and the system may provide a functionality to quantize the durations of the drawn lines to the nearest musical note duration. Furthermore, in some embodiments of the invention the system may show graphical elements assisting the user in selecting the note durations. Such graphical elements may be, for example, vertical lines representing a spacing corresponding to a certain musical interval, such as the duration of a $\frac{1}{8}^{th}$ note or a quarter note.

Embodiments of the present invention may employ any of a wide variety of devices to serve as a user interface. For example, a user's wireless device, such as a smartphone or tablet, might part of or connected to a sound processing system 106, and might be connected to other components of the system 106 through a wireless connection. Such devices usually have limited size, and any screen of any device has only a finite size. A phrase might be of longer duration than could easily be displayed on a single screen. Therefore, in one or more embodiment of the invention, multiple pages can be defined for recording, with the width of the display corresponding to a page. When reaching the end of the line at the right side of the page, a new page can be displayed, and a phrase or combination of phrases can extend between pages.

It is likely that in many instances, the user would like to use the same recording patterns on different occasions. Therefore, the system 106 may store and use pre-made presets for recording phrases, spatial information and sound filters, with this information being stored in the sound database 138.

Contents of the sound database 138 might, for example, include a selection of phrases comprising a rhythmic pattern on one or more tracks. The rhythmic patterns can correspond to common rhythm patterns in different time signatures, such as 4/4, 3/4, 7/8, and so on. A pattern may have several tracks corresponding to the typical roles of the common drums in the patterns, such as the bass drum, snare, and hihat.

User instructions may accompany one or more available patterns. For example, instructions may direct a user wishing to record a bass drum track to search for a low-frequency background noise. A user wishing to record a snare drum track would be directed to search for a background noise with a higher pitch. Alternatively, the phrase building module 132 may employ a spectral template, such as the ideal magnitude spectrum values at mel scale or bark scale bands corresponding to each instrument. After the recording, the phrase building module 132 may compare the spectral templates of the different instruments of the rhythm pattern to the spectra measured from the recorded sounds and suggest the one corresponding to the smallest distance to the user. For example, the device might prompt: "The noise you just recorded would work nicely as a snare drum: would you like to use it for the snare drum?" The system may modify the recorded sound such as by truncating it, filtering it, changing its playback rate, or applying an effect such as reverberation, chorus, or flanger to make it better match the spectral template of an instrument. A spatial information library might contain a selection of spatial patterns that could be applied to the phrase recording. Sound filters might contain, for example, high-pass and low-pass filters that could be applied to phrases. Such filters might be applied to selected phrases or to an entire recording. As another type of effect, reverberation may be applied to the phrases.

Spatial information for phrase recording could be stored as effects. For example, drawing a circle with a finger might generate a rotating spatial image. This effect would then be applied to the phrase recording, such that the rate of the spatial effect would be matched to the meter of the music. More specifically, if the effect rotates the sound full 360 degrees, the rate of the rotation could be adjusted such that the full rotation takes one full measure, or an integer number of measures such as two or four. This way the rhythmic sensation of the user is strengthened since at every downbeat the sound would be at the same spatial position despite of the spatial effect.

During playback of recorded phrases, user inputs may be interpreted in order to change the playback of the music. For example, hovering on top of the screen may change the direction of a recorded phrase in real time. Specific effects of the input might be, for example, that height of the hovering controls the volume of that track.

As a further example, an input and its effect might be that a twist orientation controls the recording orientation of a currently audible sound phrase. Such approaches can be used to replace cut-off and resonance filters commonly used to alter the sound of recording with much more flexible sound manipulation.

The user is able to draw or otherwise specify desired sound characteristics. These may include, for example, spectrum shape, spatial orientation, duration, fundamental frequency, roughness, and so on. For example, a user may draw a rough shape of the desired sound spectrum on the display device 130. A line peak on the left side of the display may indicate that the user wants a "bassy" sound with strong low frequencies. Alternatively, mechanisms may be provided to allow the user to draw pictures of musical instruments or select their names or pictures from a list to specify an instrument that the recorded sound should resemble.

Once the selections are made, ambient sound may be recorded. For example, a long clip of the background sound may be recorded by the device. The long clip may be segmented into segments of certain duration, such as half a second, and spectral and other characteristics of the segments may be analyzed. The characteristics of short segments of the recorded sound may be compared to the desired user given characteristics. The matching can be done, for example, by calculating the Euclidean distance between spectral features extracted from the noise and the user provided spectral template. When the system finds a segment which is suitable as a user specified sound, it stores the corresponding sound segment to be used as that instrument.

Such approaches allow a user to specify different characteristics to the environmental sound he wishes to record. He may instruct the system to search for a bass drum, snare drum, and a sound with vocal like characteristics, and use the sounds for rendering different tracks of the performance.

Figure 6:
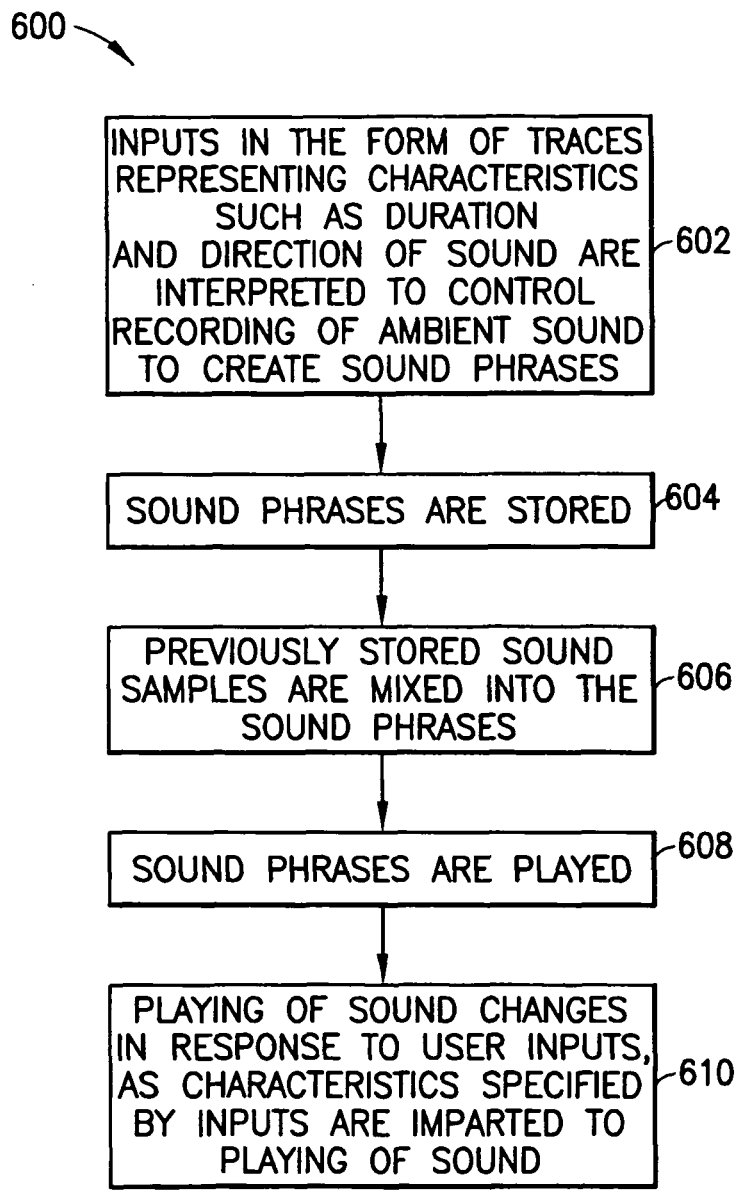
FIG. 6 illustrates a process according to an embodiment of the present invention.

FIG. 6 illustrates a process 600 according to an embodiment of the present invention. At step 602, user inputs in the form of traces indicating characteristics to be applied to a sound phrase, such as one or more of recording duration and direction, and playback direction, are interpreted to process and control recording of ambient sound to create sound phrases of the specified durations and from the specified directions. At step 604, the sound phrases are stored. At optional step 606, previously stored sound samples are mixed into the sound phrases, with characteristics represented by the inputs being applied to the previously stored sound samples. At step 608, in response to user selections, sound phrases that may include one or more of the recorded sound phrases, previously stored recorded sound phrases, previously stored sound samples, or sounds constructed in response to the user selections, are played. At step 610, the playing of the sound changes in response to further user inputs, as the inputs are interpreted to impart specified characteristics to the sound being played.

Embodiments of the present invention may be implemented in numerous different forms, such as audio systems, mobile telephones with audio recording and playback capabilities, portable sound players, and numerous other devices. It will be recognized that embodiments of the present invention may be implemented using a device comprising at least one transducer, such as a speaker module such as a speaker or a microphone, or supporting such a transducer—for example, providing a port or other aperture for a connector providing an interface to a transducer.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
at least one processor;
memory storing computer program code;

wherein the memory storing the computer program code is configured, with the processor, to cause the apparatus to perform actions comprising at least:

determining sound characteristic based on at least one user input comprising at least one trace on an input device, wherein the sound characteristics include at least a duration during which a sound is recorded, and an apparent direction from which the sound is recorded, and wherein the duration during which the sound is recorded and the apparent direction from which the sound is recorded correspond to the length and direction, respectively, of the at least one trace; and performing at least one control operation to cause a sound phrase to exhibit the sound characteristic.

2. The apparatus of claim 1, wherein performing the at least one control operation comprises processing at least one signal from at least one microphone to create a sound signal, and wherein performing the at least one control operation comprises causing the recording of the at least one sound signal.

3. The apparatus of claim 1, wherein the actions further comprise playing the sound phrase and wherein the sound characteristics comprise an apparent direction for sound playback.

4. The apparatus of claim 3, wherein the sound phrase comprises a previously stored sound phrase.

5. The apparatus of claim 3, wherein one or more components of the sound phrase are artificially generated at the time of playback.

6. The apparatus of claim 2, wherein the recorded sound signal is stored as a sound phrase exhibiting the duration and the apparent direction based on the user inputs and wherein the actions further comprise:

receiving at least one further user input specifying at least one of duration and direction for playback; and performing at least one control operation to cause playback of the sound phrase such that the sound phrase exhibits the at least one of direction and duration based on the at least one further user input.

7. The apparatus of claim 1, wherein the sound phrase is a pattern comprising at least one spatial audio component.

8. A method comprising:

configuring at least one processor to cause an apparatus to perform actions comprising at least:

determining sound characteristic based on at least one user input comprising at least one trace on an input device, wherein the sound characteristics include at least a duration during which a sound is recorded, and an apparent direction from which the is recorded, and wherein the duration during which the sound is recorded and the apparent direction from which the sound is recorded correspond to the length and direction, respectively, of the at least one trace; and performing at least one control operation to cause a sound phrase to exhibit the sound characteristics.

9. The method of claim 8, wherein performing the at least one control operation comprises processing at least one signal from at least one microphone to create a sound signal, and wherein performing the at least one control operation comprises causing the recording of the at least one sound signal.

10. The method of claim 8, wherein the actions further comprise playing the sound phrase and wherein the sound characteristics comprise a direction for sound playback.

11. The method of claim 10, wherein the sound phrase comprises a previously stored sound phrase.

12. The method of claim 10, wherein one or more components of the sound phrase are artificially generated at the time playback.

13. The method of claim 9, wherein the recorded sound signal is stored as a sound phrase exhibiting the duration and the apparent direction based on the user inputs and wherein the actions further comprise:

receiving at least one further user input specifying at least one of duration and direction for playback; and performing at least one control operation to cause playback of the sound phrase such that the sound phrase exhibits the at least one of direction and duration based on the at least one further user input.

14. A non-transitory computer readable medium storing a program of instructions, execution of which by a processor configures an apparatus to perform actions comprising at least:

determining sound characteristics based on at least one user input comprising at least one trace on an input device, wherein the sound characteristics include at least a duration during which a sound is recorded, and an apparent direction from which the sound is recorded, and wherein the duration during which the sound is recorded and the apparent direction from which the sound is recorded correspond to the length and direction, respectively, of the at least one trace; and performing at least one control operation to cause a sound phrase to exhibit the sound characteristics based on the at least one user input.

15. The non-transitory computer readable medium of claim 14, wherein performing the at least one control operation comprises processing at least one signal from at least one microphone to create a sound signal, and wherein performing the at least one control operation comprises causing the recording of the at least one sound signal.

16. The non-transitory computer readable medium of claim 14, wherein the actions further comprise playing the sound phrase and wherein the sound characteristics comprise a direction for sound playback.

17. The non-transitory computer readable medium of claim 16, wherein the sound phrase comprises a previously stored sound phrase.

18. The non-transitory computer readable medium of claim 16, wherein one or more components of the sound phrase are artificially generated at the time of playback.

19. The non-transitory computer readable medium of claim 16, wherein the recorded sound signal is stored as a sound phrase exhibiting the duration and the apparent direction specified by the user inputs and wherein the actions further comprise:

receiving at least one further user input specifying at least one of duration and direction for playback; and performing at least one control operation to cause playback of the sound phrase such that the sound phrase exhibits the at least one of direction and duration based on the at least one further user input.

* * * * *

UNITED STATES PATENT AND TRADEMARK OFFICE
CERTIFICATE OF CORRECTION

PATENT NO. : 9,135,927 B2  
APPLICATION NO. : 13/460039  
DATED : September 15, 2015  
INVENTOR(S) : Lehtiniemi et al.

Page 1 of 1

It is certified that error appears in the above-identified patent and that said Letters Patent is hereby corrected as shown below:

In the claims

Claim 8, col. 9, line 48 --sound-- should be inserted in between "the" and "is".

Signed and Sealed this
Fifteenth Day of December, 2015

Michelle K. Lee
*Director of the United States Patent and Trademark Office*